Feb. 21, 1933. C. A. WINSLOW 1,898,027
AIR FILTER
Filed Jan. 10, 1929
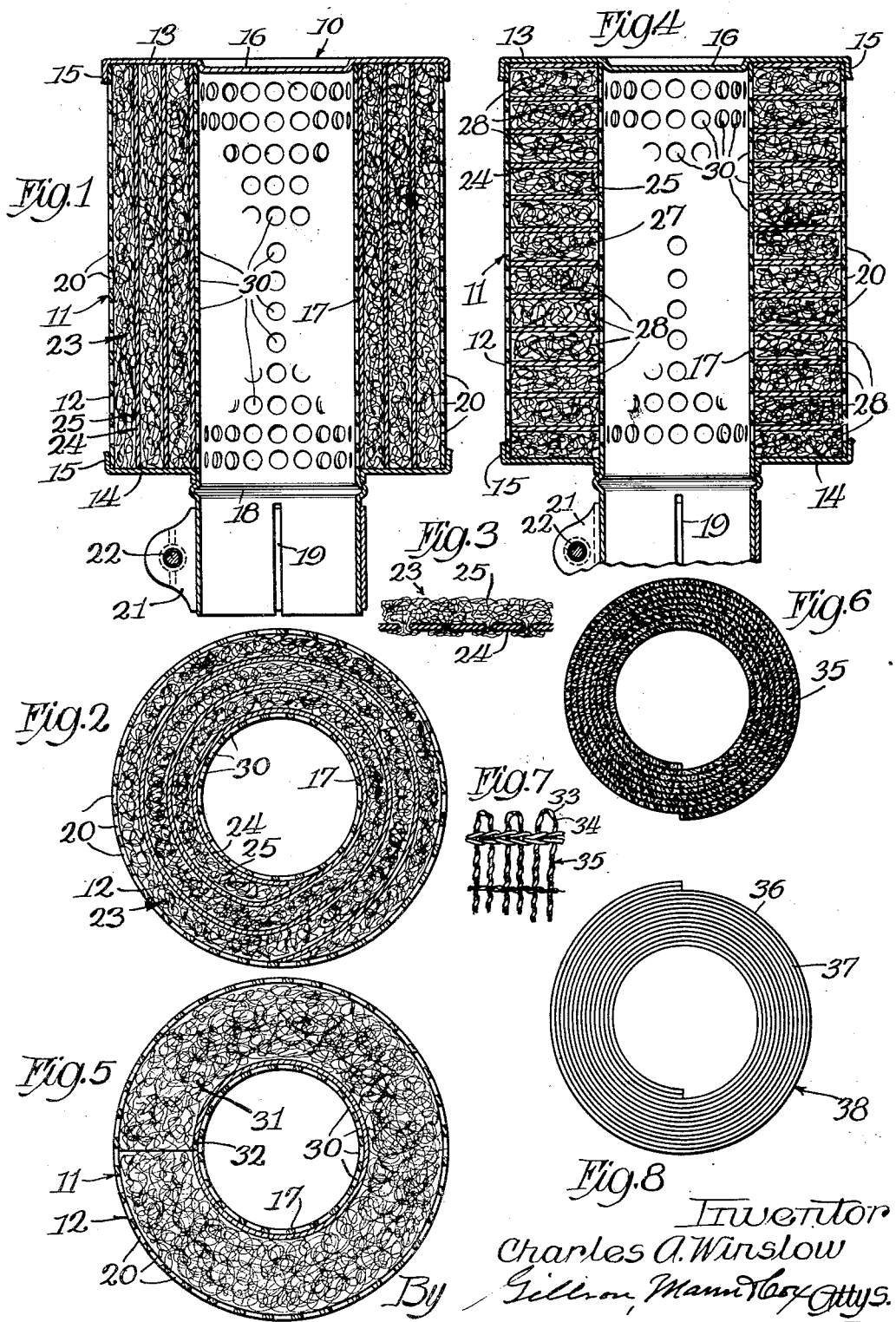
Inventor
Charles A. Winslow
By Gillson, Mann/Cox Attys.

Patented Feb. 21, 1933

1,898,027

UNITED STATES PATENT OFFICE

CHARLES A. WINSLOW, OF VALLEJO, CALIFORNIA

AIR FILTER

Application filed January 10, 1929. Serial No. 331,488.

This invention relates to air filters for internal combustion engines.

The principal object of the invention is the provision of a new and improved air filter having novel means for supplying a liquid such as oil to the filter medium.

Another object of the invention is the provision of a new and improved filter medium and its arrangement in an air filter for the air intake of an internal combustion engine.

A still further object of the invention is the provision of a new and improved air filter that is simple in construction, cheap to manufacture, easily assembled, efficient in operation, and that will not easily become clogged with dirt, dust or other foreign matter.

Other and further objects and advantages of the invention will appear from the following description taken in connection with the accompanying drawing, in which Fig. 1 is a vertical section of the device;

Fig. 2 is a horizontal section of the device shown in Fig. 1;

Fig. 3 is a cross-section of a portion of the filter material;

Fig. 4 is a vertical section of the device showing a modified arrangement of the filter material;

Fig. 5 is a cross-section of a filter with a still different form of arrangement for the filter material;

Fig. 6 is a plan view of a modified form of filter material;

Fig. 7 is a fragmentary view of the filter material shown in Fig. 6; and

Fig. 8 is a plan view of a still further modified form of filter material.

It is well known that animal fiber, such as hair, and finely divided mineral matter such as metal fabric or metal wool, or reticulated metal material such as wire screen and the like, make excellent air filter material if they can be kept moistened with a liquid such as oil for collecting the dust. For the purpose of this description the latter will be referred to throughout the description as metallic fiber, and the liquid employed will be considered as oil, although it is understood that any other suitable liquid may be employed. The cohesion between the oil and hair or metal is not sufficient to retain the oil against the force of the intake air for any considerable length of time. Filter material of vegetable fiber is objectionable because, while it will retain the oil, it soon becomes clogged with dust and in a comparatively short time becomes inoperative as an efficient air filter.

The present invention seeks to provide an air filter of a mass of material of loose texture such as metal or animal fiber with means for automatically supplying oil to the filter material in a cheap and simple manner. It has been found that by bringing the animal fiber or metal filter material in contact with vegetable fiber or fabric impregnated with oil, oil will be supplied to the filter material by capillary attraction to moisten the same for removing the dust from the air passing through said filter.

Any suitable material may be employed as a filter member. A thick layer of animal hair secured to a fabric of vegetable fiber such as burlap for constituting a backing gives good results and an exceedingly cheap filter can be manufactured from such material.

A suitable casing is provided for containing the filter member and for directing the air therethrough. In the form of the device selected to illustrate one embodiment of the invention, the reference character 10 designates generally the filter which comprises a casing 11 composed of the outer tubular member or wall 12 and the outer and inner end members or caps 13 and 14. The inner end member 14 may, if desired, be rigidly connected to the tubular member 12.

The outer end member 13 is in the form of a cap removably mounted on the tubular member 12 as by being provided with a flange 15 which is adapted to embrace and frictionally engage the upper end of said tubular member. Spot welding, solder, screws or any other well known means may be employed for holding the cap in position.

The cap 13 is provided with an annular central depression 16 which is adapted to engage within the upper end of an inner tubular member 17 which has its lower end extending through and beyond the inner end member 14. The tubular member 17 is provided with a bead 18 which forms a shoulder for positioning the end or cap member 14. The inner end of the tubular member 17 is preferably provided with one or more slots 19 and with a clamping band 21 whereby the device may be slipped over the end of the carburetor and intake of an internal combustion engine and clamped in position thereon by a suitable clamping bolt 22. For convenience of description the tubular members 12 and 17 will be referred to as the outer and inner walls, respectively, of the casing 11.

The outer and inner walls 12 and 17 of the casing are provided with openings 20 and 30 through which air may pass into the tubular member 17 and on into the engine intake.

The filter member 23 is placed within the casing between the outer and inner walls 12 and 17. This material in the form of construction shown in Figs. 1 and 2 comprises a backing of vegetable fiber material, as burlap 24, see Fig. 3, to which is attached a comparatively thick layer of animal hair 25. The layer of hair is attached by stitching, tufting, or by drawing loops of the hair through the fabric. The filter member 23 may be rolled in the form of a spiral with the hair outward and inserted in the space between the walls 12 and 17 as shown in Figs. 1 and 2, after the same has been impregnated with oil, or may be assembled first and dipped in oil, etc., after assembly, as desired. By removing the cap 13 the filter member 23 may be removed and cleaned as often as necessary, or the whole assembly unit may be removed, washed out and reoiled without disassembling.

The oil impregnated burlap backing will continually supply a film of oil to the hair and the air passing therethrough will have the dust and other foreign matter removed by coming in contact with the oil film on the hair.

The form of the device shown in Fig. 4 differs from that shown in Fig. 1 in that the filter member 27 is formed of a plurality of disks 28 of the filter material shown in Fig. 3, each having a central opening for receiving the inner tubular member 17. The disks of filter material are placed in the casing 11 with the burlap or backing of vegetable fiber spaced between the fibrous material whereby when the disks have been saturated, oil will be continually supplied to the hair 25 by capillary attraction, from the saturated fibrous material 24.

The form of construction shown in Fig. 5 differs from that in Figs. 1 and 2 in that the layer of hair 31 is sufficiently thick that it and the burlap backing 32 will fill the space between the inner and outer walls of the filter casing. In this form of construction the filter material is cut the proper length to roll into a cylinder.

In Figs. 6 and 7 is shown a modified form of filter material in which strands of vegetable fiber material 33 are twisted about strands of metal 34 and then woven into what may be termed a cloth 35. The cloth of suitable width is then rolled spirally into a cylinder and after being dipped in oil is inserted in the casing in the same manner as has been described.

In this form of construction the oil impregnated vegetable fiber will continually supply a film of oil to the strands of metal, whereby the fabric will collect the dust from the air as the same passes therethrough.

In the form of construction shown in Fig. 8 a wire screen 36 and a fabric of vegetable fiber 37 are arranged alternately and rolled into a spiral to form a cylinder 38 which, after being dipped in oil, is adapted to be inserted in the casing 11 in the manner described above. In this form of construction the fabric of vegetable material is adapted to continually supply an oil film to the wire screen for removing the dust from the air passing through the filter.

The parts of the casing 11 are shown as being stamped from sheet metal although it is understood that these parts may be cast or made in any suitable manner. By being made from sheet metal an extremely cheap filter is provided, and one in which the filter material may be readily removed for cleaning or replacement.

While I have shown the outer casing 12 as being of sheet metal with openings therein for the passage of air, it is understood that a wire screen or other reticulated member may be substituted therefor. It is also understood that the form of the filter may be changed to include one or more sheets of the above described filter material held in a flat frame suitable for filtering the air passing through large pipes or ducts and also, owing to the flexible nature of this form of filtering material, it may be employed on single or double movable cylinders or rolls whereby it would be slowly rolled through a bath of oil, water, etc., for continuous filtering and washing.

I claim as my invention:

1. In an air filter, a casing formed by an outer endless foraminous wall, an inner endless foraminous wall spaced from said outer wall, and filter means in the space between said walls, said means comprising a backing of vegetable fiber adapted to be impregnated with oil with fibrous material of non-vegetable origin attached thereto.

2. In an air filter, a casing having openings in its side walls for the passage of air therethrough, filter means in said casing, said means comprising a layer of vegetable fibrous material and a layer of fibrous material of non-vegetable origin in contact with said first named material whereby when said first named material is impregnated with oil the same will be conducted to said second named material, said means being rolled into a tight roll and inserted in said casing, the second named material being outwardly of said roll and adjacent to said casing.

3. An air filter comprising a casing having openings in its side walls for the passage of air therethrough, a filter member within said casing, said member comprising a layer of animal fiber secured to a fabric of vegetable fiber, said member being rolled into a tight roll and inserted in said casing with the animal fabric nearest to said casing, said fabric being adapted to be impregnated with oil for supplying the same to said layer of animal fiber, and means for attaching said casing to the intake passage of an internal combustion engine whereby air taken in by said engine will pass through said animal fiber for filtering the dust therefrom.

4. An air filter comprising a casing having a plurality of air openings in its walls, a conduit extending into said casing, said conduit having a plurality of air passages in its walls, a filter element between the walls of said casing and conduit, said element comprising fibrous material of vegetable origin in contact with a mass of filter material of loose texture, said first named material being impregnated with oil for supplying oil to said second named material for removing dust from the air passing through said filter.

5. In an air filter, a filter body composed of strands of metal and filaments of organic matter mutually interwoven to form a clothlike web, said clothlike web being rolled into an annular tight roll of a plurality of layers with said filaments extending parallel to the axis of said roll.

6. In an air filter, a web of filter material tightly rolled into an annular roll to form a filter body, comprising metal strands and filaments of organic matter extending longitudinally of the axis of said roll, the strands of metal forming said filter web and filaments of organic matter being mutually intertwined and impregnated with oil, whereby the oil absorbed by the organic matter will by capillarity continue to spread over the surface of the metal strands.

In testimony whereof I affix my signature.

CHARLES A. WINSLOW.